United States Patent

Koschany et al.

[11] Patent Number: 5,998,057
[45] Date of Patent: Dec. 7, 1999

[54] GAS DIFFUSION ELECTRODE FOR POLYMER ELECTROLYTE MEMBRANE FUEL CELLS

[75] Inventors: Arthur Koschany, Poecking; Christian Lucas, Planegg; Thomas Schwesinger, Kirchroth, all of Germany

[73] Assignee: Magnet-Motor Gesellschaft für Magnetmotorische Technik GmbH, Starnberg, Germany

[21] Appl. No.: 09/077,408
[22] PCT Filed: Nov. 28, 1996
[86] PCT No.: PCT/EP96/05276
  § 371 Date: Oct. 5, 1998
  § 102(e) Date: Oct. 5, 1998
[87] PCT Pub. No.: WO97/20359
  PCT Pub. Date: Jun. 5, 1997

[30] Foreign Application Priority Data

Nov. 28, 1995 [DE] Germany .......................... 195 44 323

[51] Int. Cl.⁶ ..................................................... H01M 4/86
[52] U.S. Cl. .................. 429/42; 429/41; 429/40; 204/283; 521/27; 427/115; 427/77; 427/123; 427/372.2; 427/383.1; 427/384

[58] Field of Search .................................. 429/42, 41, 40; 204/282, 283; 521/27; 427/115, 77, 123, 372.2, 383.1, 384

[56] References Cited

U.S. PATENT DOCUMENTS

| | | | |
|---|---|---|---|
| 4,518,705 | 5/1985 | Soloman et al. | 429/42 |
| 5,217,821 | 6/1993 | Landsman et al. | 429/42 |
| 5,441,823 | 8/1995 | Naimer et al. | 429/42 |
| 5,702,839 | 12/1997 | Frost et al. | 429/42 |
| 5,716,437 | 2/1998 | Denton et al. | 429/42 |

*Primary Examiner*—Bruce F. Bell
*Attorney, Agent, or Firm*—Venable; George H. Spencer

[57] ABSTRACT

A particularly inexpensive, lightweight, homogeneous and porous gas diffusion electrode for polymer electrolyte membrane fuel cells is made in that carbonized carbon fiber nonwoven fabric is coated with a mixture of a soot suspension and a polytetrafluoroethylene suspension and sintered thereafter. The gas diffusion electrode may have a catalytically active layer applied thereto.

21 Claims, 1 Drawing Sheet

GAS DIFFUSION ELECTRODE FOR POLYMER ELECTROLYTE MEMBRANE FUEL CELLS

The invention relates to polymer electrolyte membrane fuel cells, in particular gas diffusion electrodes for fuel cells or electrolysis cells, a method of making a gas diffusion electrode for fuel cells or electrolysis cells, a method of coating gas diffusion electrodes with a catalytically active layer, and a method of making a membrane and electrode unit.

In polymer electrolyte membrane fuel cells, a gas diffusion mat is used as electrode between polymer electrolyte membrane and current collectors, such as e.g. bi-polar plates. This mat has the function of dissipating the current produced in the membrane, and it has to allow diffusion of the reaction gasses to the catalytic layer. Moreover, the gas diffusion electrode has to be hydrophobic at least in the layer facing the membrane, in order to prevent that water formed in the reaction process floods the pores of the gas diffusion electrode. For many applications, for example aerospace, it is important furthermore that the materials employed for building the cell stacks are of light weight and consume little space. An as inexpensive as possible fabrication of the materials is always of interest.

So far, mats of graphitized fabric are used for such gas diffusion electrodes, which are available from a density of 116 g/m². The gas diffusion mats of graphitized fabric often do not permit sufficiently good diffusion of oxygen, in particular $O_2$ from the air under low pressure, and moreover they are relatively heavy. Fabrication thereof necessitates high temperatures, resulting in a correspondingly high consumption of energy and high prices.

SUMMARY OF THE INVENTION

It is the object of the invention to make available a gas diffusion electrode which is inexpensive to manufacture and of light weight and which permits good diffusion of oxygen, in particular from the air under a slight pressure above atmospheric, and which furthermore displays the required high electrical conductivity and is hydrophobic.

A further object of the invention is to make available a polymer electrolyte membrane fuel cell comprising such a gas diffusion electrode.

An additional object of the invention consists in indicating a method of making such a gas diffusion electrode.

Another object of the invention is to make available a method of coating a gas diffusion electrode with a catalytically active layer.

A still further object of the invention consists in indicating a method of making a membrane electrode unit.

These objects are met by the gas diffusion electrode of the present as set forth below.

DETAILED DESCRIPTION OF THE PREFERRED EMBODIMENT

Figure 1:
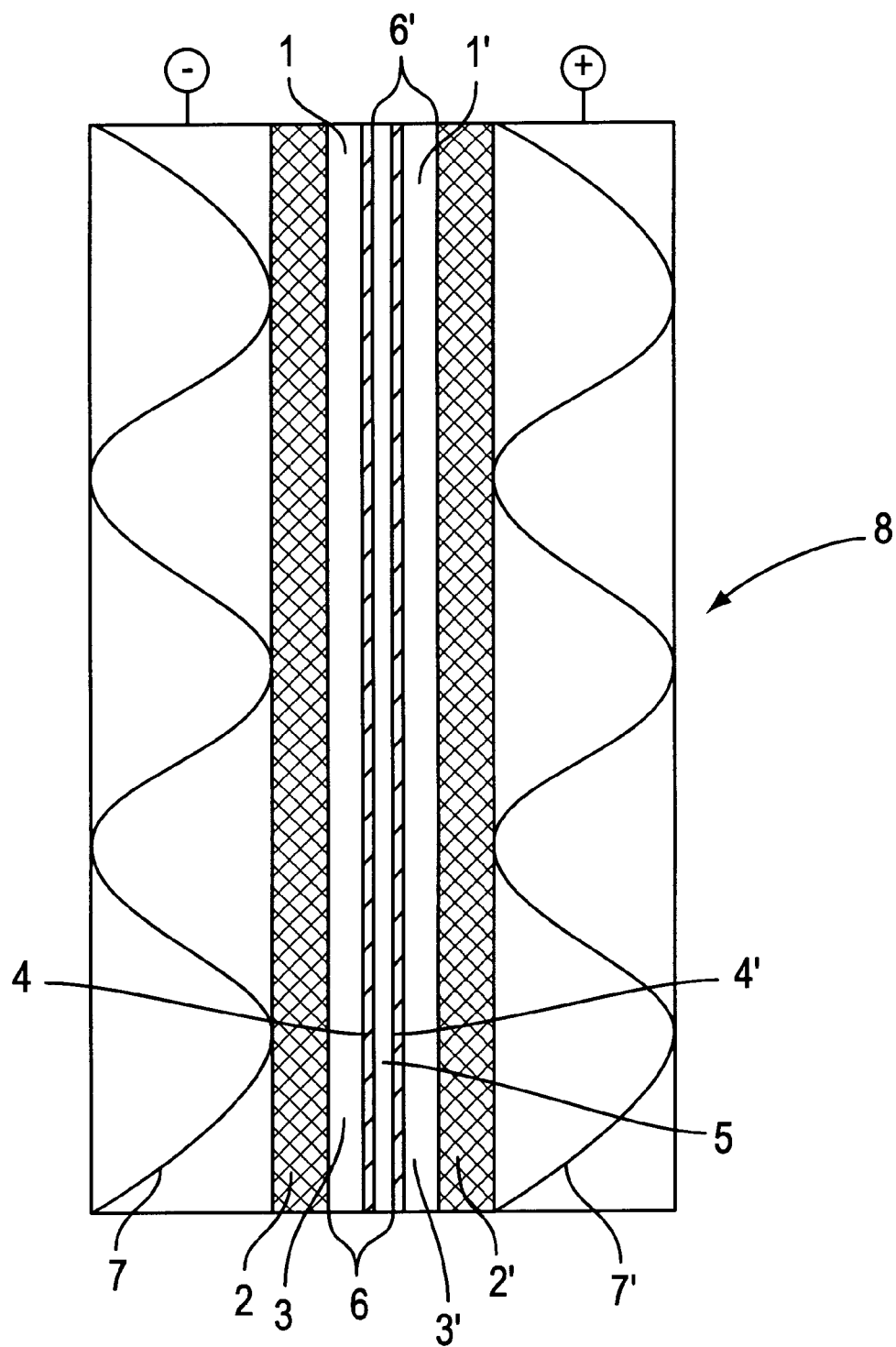
FIG. 1 shows a polymer electrolyte membrane fuel cell.

The gas diffusion electrodes according to the invention are suitable for fuel cells, in particular polymer electrolyte membrane fuel cells, and polymer electrolyte membrane electrolysis cells. In polymer electrolyte fuel cells, the gas diffusion electrodes according to the invention can be utilized both as anode and as cathode, whereas in electrolysis cells they can be employed only on the hydrogen side, as oxidation would take place on the oxygen side. The gas diffusion electrodes according to the invention can be used in especially advantageous manner in polymer electrolyte membrane fuel cells using hydrogen as fuel gas and air as oxidant and operated at low pressure of less than 0.5 bar, preferably less than 0.1 bar. Particularly preferred are operating pressure differences in the order of magnitude of about 10 mbar.

As starting material for the gas diffusion electrodes according to the invention, a very lightweight carbon fiber nonwoven fabric, preferably of carbonized fibers is used. Particularly suitable are carbonized carbon fiber nonwoven fabrics having mass-area ratios of up to 60 g/m², typically 30 g/m². Carbonized carbon fibers can be produced with much lower expenses than graphitized fibers, since their manufacture requires considerably lower temperatures.

For fabrication of a gas diffusion electrode according to the invention, a suspension is prepared first from soot and at least one liquid, e.g. a suspension of Vulcan XC 72 and water. For reducing the surface tension, additives such as e.g. isopropanol may be added. Such additives improve the making of the suspension since they effect better wettability of the soot and thus better miscibility of soot and suspension liquid. This liquid is mixed intensively with a suspension of polytetrafluoroethylene (PTFE) in at least one liquid, preferably water. PTFE and soot are employed preferably in a mass ratio of 1:10 to 1:1. Typical is 25 to 40% of PTFE related to the weighed-in amount of soot. The carbon fiber nonwoven fabric is impregnated with this mixture, or this mixture is evenly applied to the carbon fiber nonwoven fabric, respectively, so that the carbon fiber nonwoven fabric is impregnated in substantially homogeneous manner. Thereafter, the carbon fiber nonwoven fabric is dried, with the temperatures required for drying being dependent upon the type of the liquids used. As a rule, drying at higher temperatures than room temperature is of advantage, e.g. about 110° C. or above in case of mainly aqueous suspensions. Impregnating and drying of the carbon fiber nonwoven fabric can be repeated once or several times. The thus impregnated carbon fiber nonwoven fabric is finally sintered at a temperature of at least 200° C. Preferably, sintering takes place for half an hour at temperatures of about 300° C. to 400° C.

The thus obtained electrode of carbon fiber nonwoven fabric is particularly homogeneous, porous and light, but nevertheless is mechanically very stable. It permits better diffusion of oxygen than the graphitized fabrics used so far and due to its lower weight as compared to graphitized fabrics contributes in reducing the overall weight of fuel cells. An important factor furthermore consists in the savings in the manufacturing process of the gas diffusion electrodes according to the invention as compared to graphitized fabrics: the manufacture of the carbon fiber nonwoven fabrics requires lower temperatures than in case of graphitized fabrics, which results in savings of energy and costs. Due to their share of soot and polytetrafluoroethylene, the gas diffusion electrodes according to the invention have the required high conductivity for electrical current, and they are hydrophobic.

The gas diffusion electrode fabricated as described hereinbefore, can now be installed in a polymer electrolyte membrane fuel cell. Due to the fact that the electrode does not contain a catalytically active layer, a membrane coated with a catalyst has to be used. As an alternative, it is however also possible to coat the gas diffusion electrode according to the invention with a catalyst. The catalytic layer has to be gas permeable and have electrical conductivity as well as $H^+$-ion conductivity and, of course, has to catalyze the desired reaction. These properties are obtained with a very thin layer containing a mixture of ion conductive material, e.g. nafion polymer and noble metal catalyst. The preferred noble metal catalyst used is platinum on carbon carrier. A very favorable platinum load is about 0.2 mg/cm$^2$ of the gas diffusion electrode. The mass ratio of platinum on the carbon carrier to nation typically is in the range from 2:1 to 4:1. The carbon carrier is electrically conductive and porous, so that sufficient conductivity and gas permeability of the catalytic layer is ensured. The polymer at the same time serves as a binder for the layer. The low layer thickness in the order of magnitude of about 20 μm ensures short transport paths for electrons, $H^+$-ions and gas.

According to the invention, a gas diffusion electrode is coated with a catalytically active layer as follows: noble metal catalyst on carbon carrier, e.g. 20% Pt, 80% C, is mixed intensively with ion conducting polymer in solution or suspension. As ion conducting polymer, e.g. nafion dissolved in alcohols and water may be used. The suspension possibly may be diluted with a suitable liquid, e.g. water. The suspension of catalyst and polymer is applied onto a surface of the gas diffusion electrode, and the layer applied is then dried. In most cases it is advantageous before application of the suspension to evaporate part of the alcohols, possibly at a slightly increased temperature. Evaporation of part of the alcohols serves to increase the surface tension of the suspension, for in case of a too low surface tension there is the risk, that the impregnated carbon fiber nonwoven fabric will soak in the suspension. However, the aim consists in obtaining a thin catalyst layer on the surface of the impregnated carbon fiber nonwoven fabric.

The catalytically active layer can be applied e.g. by spraying, screen printing or by application with a brush. Particularly good adhesion of the catalytically active layer is obtained when the application and drying steps are repeated once or several times. The formation of cracks in the layer can also be reliably avoided in this manner. The catalytically active layer need not necessarily be homogeneous through its entire thickness, rather it is in most cases more favorable when there is a concentration gradient with respect to electrically and ion conducting material perpendicularly to the layer. When the layer is applied in several steps, it is easily possible by selection of the suitable concentrations of the respective suspension of carbon and polymer to obtain layers which are rich in carbon on the carbon fiber nonwoven fabric, but rich in polymer on the side facing the membrane later on. Such a distribution of electron conducting carbon and ion conducting polymer is of advantage in so far as it is adapted to the different concentration of electrons and ions in the catalytically active layer. For example, when looking at the anode, the fuel gas passing from the carbon fiber nonwoven fabric into the catalytically active layer is ionized in increasing manner on its path through the layer towards the polymer electrolyte membrane, so that the concentration of ions and thus the need for ion conducting material in portions of the catalytically active layer near the membrane is higher than in the portions adjacent the carbon fiber nonwoven fabric. The concentration of electrons and thus the need for electron conducting carbon, however, is lower in the portions near the membrane, since it is not the total quantity of the released electrons that passes these portions, but only the electrons released during the ionization of the neutral remaining gas that is still left in the respective portion. Analogously therewith, the oxidation gas is increasingly ionized in the catalytically active layer on its way through the layer by absorption of electrons, so that here too, the ion concentration is higher in portions near the membrane and the electron concentration is lower than in portions remote from the membrane.

The method can be utilized with any non-catalyzed gas diffusion electrode.

The gas diffusion electrode can be reinforced by a conductive grid. Particularly suitable for the grid is a nickel square mesh fabric having a mesh aperture of 0.4 to 0.8 mm and a wire gauge of 0.12 to 0.28 mm. Nickel is a favorable material in so far as it is chemically inert for the conditions in the fuel cell and has a considerably lower transition resistance to impregnated carbon fiber nonwoven fabric than e.g. stainless steel. Upon assembly of the fuel cell, the grid is installed on the side of the gas diffusion electrode facing away from the membrane. The function of the grid consists in ensuring very good current dissipation from the gas diffusion electrode and in urging the electrode uniformly against the membrane at the same time.

If necessary, it is also possible to combine several carbon fiber nonwoven fabrics after impregnation and sintering so as to form a gas diffusion electrode. The use of several impregnated carbon fiber nonwoven fabrics on top of each other reduces the risk that the grid and/or parts of the current collectors, e.g. of the bipolar plates, push through up to the membrane and damage the same. Typically, two to three impregnated carbon fiber nonwoven fabrics are combined with each other. The use of more than four carbon fiber nonwoven fabrics on top of each other may result in a no longer sufficient gas diffusion, which makes itself felt in the U-I-characteristic. For obtaining good adhesion of the impregnated carbon fiber nonwoven fabrics to each other, the desired number of impregnated and sintered carbon fiber nonwoven fabrics can be subjected to pressing, with pressures of up to 500 bar and temperatures of up to 400° C. being applied preferably. Typical conditions are a pressure of about 200 bar and a temperature of about 140° C. Coating of a surface of such a gas diffusion electrode with a catalyst is carried out best after pressing.

The gas diffusion electrode according to the invention can be combined with a polymer electrolyte membrane so as to form a membrane and electrode unit. Depending on whether or not the gas diffusion electrode carries a catalytically active layer, either a membrane without or with a catalytically active layer has to be used. For fabrication of a membrane and electrode unit, a gas diffusion electrode which may be composed of one or several impregnated carbon fiber nonwoven fabrics, is disposed on one side of a polymer electrolyte membrane present in its $H^+$-form and is then pressed on at pressures of up to 500 bar and temperatures of up to 250° C. Typical conditions are a pressure of about 200 bar and a temperature of about 125° C. When the gas diffusion electrode contains the catalytically active layer, it must be pressed onto the membrane such that the catalytically active layer is in contact with the membrane. This can be performed for both sides of the membrane, so that both the anode and the cathode can be fabricated in this manner. By such pressing-on, electrical contact between the catalyst layer on the membrane and the carbon fiber nonwoven fabric or between the catalyst layer on the carbon fiber nonwoven fabric and the membrane, respectively, is improved considerably as compared to loose clamping together thereof. Prior to installation of the membrane and electrode unit in a polymer electrolyte membrane fuel cell, the gas diffusion electrodes on the side facing away from the membrane can be reinforced by the addition of a grid.

A particularly preferred embodiment of a fuel cell with a gas diffusion electrode according to the invention is shown in FIG. 1. Anode 1 and cathode 1' are constituted by impregnated carbon fiber nonwoven fabrics 3 and 3'. Anode 1 and cathode 1', on their sides facing the polymer electrolyte membrane 5, each carry a catalyst layer 4 and 4', respectively. Anode 1 and cathode 1' together with polymer electrolyte membrane 5 constitute the membrane and electrode unit 6 and 6', respectively. Anode 1 and cathode 1', on their sides facing away from the membrane, are reinforced by conductive grids 2 and 2', respectively. The bipolar plates 7 and 7' confine the cell on the anode and cathode sides, respectively.

An example of the fabrication of a gas diffusion electrode according to the invention:

45 g soot (Vulcan XC 72) is suspended in 450 ml water and 495 ml isopropanol. This suspension is mixed intensively with 32.17 g of a PTFE suspension (60% Hostaflon fibers in aqueous suspension). The resulting mixture is evenly brushed onto a carbonized carbon fiber nonwoven fabric (30 g/m$^2$), and the nonwoven fabric then is dried at a temperature of about 70° C. Brushing on and drying is repeated twice. After the last drying step, the impregnated carbon fiber nonwoven fabric is sintered for about 30 minutes at 400° C. One thus obtains a carbon fiber nonwoven fabric that is uniformly impregnated with Vulcan XC 72 (trademark) and Hostaflon(trademark).

An example for coating a gas diffusion electrode with a catalytically active layer:

0.6 g of noble metal catalyst on carbon carrier (20% PT, 80% C) are intensively mixed with 4.0 g of a 5-percent nafion solution (nafion dissolved in low aliphatic alcohols and water) and 10.0 g water. Thereafter, 2 g of the alcohols contained therein are evaporated at 50° C. so as to increase the surface tension of the suspension. The suspension now is sprayed onto an impregnated carbon fiber nonwoven fabric and thereafter dried at 80° C. The spraying and drying steps are repeated twice. The result hereof is a gas diffusion electrode coated with a catalyst.

The thus fabricated gas diffusion electrode permits a better diffusion of oxygen than graphitized fabric, displays high electrical conductivity due to its soot content and is hydrophobic due to its PTFE content. In addition thereto, it can be fabricated in less expensive manner, is very homogeneous and has a lower mass-area ratio than the graphitized fabrics with soot known so far.

We claim:

1. A polymer electrolyte membrane fuel cell gas diffusion electrode (1, 1') that is electrically conductive, hydrophobic and gas permeable, characterized in that it comprises at least one carbon fiber nonwoven fabric (3, 3') consisting of carbonized fibers and having a mass-area ratio of up to 60 g/m$^2$, said carbon fiber nonwoven fabric being impregnated with soot and polytetrafluoroethylene in substantially homogenous manner and being sintered, in the impregnated state, at a temperature of at least 300° C.

2. The polymer electrolyte membrane fuel cell gas diffusion electrode (1, 1') of claim 1, characterized in that it comprises one to four carbon fiber nonwoven fabrics.

3. The polymer electrolyte membrane fuel cell gas diffusion electrode (1, 1') of claim 1, characterized in that it comprises a catalytically active layer (4, 4').

4. The polymer electrolyte membrane fuel cell gas diffusion electrode (1, 1') of claim 3, characterized in that the catalytically active layer (4, 4') comprises electrically conducting and ion conducting material, the concentration of the electrically conducting material perpendicularly to the layer decreasing with increasing distance from the carbon fiber nonwoven fabric and the concentration of the ion conducting material increasing.

5. The polymer electrolyte membrane fuel cell gas diffusion electrode (1, 1') of claim 3, characterized in that the catalytically active layer (4, 4') comprises at least one noble metal catalyst on carbon carrier and at least one ion conducting polymer.

6. The polymer electrolyte membrane fuel cell gas diffusion electrode (1, 1') of claim 1, characterized in that it is reinforced by a conductive grid (2, 2').

7. The polymer electrolyte membrane fuel cell gas diffusion electrode (1, 1') of claim 6,
characterized in that the grid (2, 2') is a nickel square mesh fabric having a mesh aperture of 0.4 to 0.8 mm and a wire gauge of 0.12 to 0.28 mm.

8. A membrane and electrode unit (6; 6') comprising a polymer electrolyte membrane (5), at least one gas diffusion electrode (1; 1') and a catalytically active layer (4; 4') provided therebetween, characterized in that the gas diffusion electrode is at least one polymer electrolyte membrane fuel cell gas diffusion electrode (1; 1') according to claim 1.

9. A polymer electrolyte membrane fuel cell (8) comprising an anode (1), a cathode (1'), a polymer electrolyte membrane (5) disposed between anode and cathode, characterized in that at least one of the electrodes (1, 1') is designed as a polymer electrolyte membrane fuel cell gas diffusion electrode according to claim 1.

10. A method of making a polymer electrolyte membrane fuel cell gas diffusion electrode (1, 1') for a polymer electrolyte membrane fuel cell (8), comprising the following steps:
a) preparing a suspension of soot and at least one liquid,
b) providing a suspension of polytetrafluoroethylene and at least one liquid,
c) intensively mixing the suspensions formed in step a) and step b),
d) impregnating, in substantially homogeneous manner, a carbonized carbon fiber nonwoven fabric having a mass-area ratio of up to 60 g/m$^2$ with the mixture produced in step c),
e) drying the impregnated carbon fiber nonwoven fabric,
f) sintering the impregnated carbon fiber nonwoven fabric at a temperature of at least 300° C.

11. The method of claim 10,
characterized in that steps d) and e) are repeated once or several times.

12. The method of claim 10, characterized in that the at least one sintered carbon fiber nonwoven fabric is pressed at a pressure of up to 500 bar and a temperature of up to 400° C.

13. The method of claim 10, characterized in that drying of the impregnated carbon fiber nonwoven fabric takes place at a higher temperature than room temperature.

14. The method of claim 10, characterized in that at least one agent for reducing the surface tension is added to the suspension of soot and at least one liquid.

15. The method of claim 10, characterized in that polytetrafluoroethylene and soot are used in a mass ratio of 1:10 to 1:1.

16. A method of coating a gas diffusion electrode (1, 1') on a surface thereof with a catalytically active layer, the coating operation comprising the following steps:
a) intensively mixing noble metal catalyst on carbon carrier with ion conducting polymer in solution or suspension,
b) applying the suspension formed in step a) onto a surface of the polymer electrolyte membrane fuel cell gas diffusion electrode (1, 1'), c) drying the layer applied, characterized in that the gas diffusion electrode (1, 1') used is a polymer electrolyte membrane fuel cell gas diffusion electrode according to claim 1.

17. The method of claim 16, characterized in that part of the suspension liquid is evaporated prior to application of the suspension made in step a).

18. The method of claim 16, characterized in that steps b) and c) are repeated once or several times.

19. The method of claim 18, characterized in that suspensions of different concentration of noble metal catalyst on carbon carrier and ion conducting polymer are used.

20. A method of making a membrane and electrode unit (6, 6'), comprising the following steps:
   a) preparing a polymer electrolyte membrane (5) in H$^+$-form with or without a catalytically active coating,
   b) disposing a polymer electrolyte membrane fuel cell gas diffusion electrode (1, 1') according to claim 1 on one or both sides of the polymer electrolyte membrane (5) when the latter is catalytically coated,
   c) pressing the assembly of polymer electrolyte membrane fuel cell gas diffusion electrode (1, 1') and membrane (5) at a pressure of up to 500 bar and a temperature of up to 250° C.

21. A method of making a membrane and electrode unit (6, 6'), comprising the following steps:
   a) preparing a polymer electrolyte membrane (5) in H$^+$-form with or without a catalytically active coating,
   b) disposing a polymer electrolyte membrane fuel cell gas diffusion electrode (1, 1') according to claim 3 on one or both sides of the polymer electrolyte membrane (5) when the latter is not catalytically coated,
   c) pressing the assembly of polymer electrolyte membrane fuel cell gas diffusion electrode (1, 1') and membrane (5) at a pressure of up to 500 bar and a temperature of up to 250° C.

* * * * *